(12) United States Patent
Azzi

(10) Patent No.: US 9,421,870 B2
(45) Date of Patent: Aug. 23, 2016

(54) REGENERATIVE BRAKING SETPOINT MATCHING

(71) Applicant: RENAULT s.a.s, Boulogne-Billancourt (FR)

(72) Inventor: Hamid Azzi, Maurepas (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 131 days.

(21) Appl. No.: 14/350,701

(22) PCT Filed: Oct. 9, 2012

(86) PCT No.: PCT/FR2012/052292
§ 371 (c)(1),
(2) Date: May 7, 2014

(87) PCT Pub. No.: WO2013/054034
PCT Pub. Date: Apr. 18, 2013

(65) Prior Publication Data
US 2014/0257663 A1    Sep. 11, 2014

(30) Foreign Application Priority Data
Oct. 10, 2011   (FR) .................... 11 59106

(51) Int. Cl.
*B60T 1/10*    (2006.01)
*B60L 7/18*    (2006.01)
(Continued)

(52) U.S. Cl.
CPC .. B60L 7/18 (2013.01); B60L 7/26 (2013.01); B60T 1/10 (2013.01); B60T 13/586 (2013.01); B60W 10/08 (2013.01); B60W 10/184 (2013.01); B60W 30/18127 (2013.01);
(Continued)

(58) Field of Classification Search
CPC ........ B60T 1/10; B60T 8/1766; B60T 8/441; B60L 3/0038; B60L 7/18; B60L 7/26; B60W 10/06; B60K 6/52
USPC .................... 701/22, 29.2, 70, 80; 303/152; 188/106 P
See application file for complete search history.

(56) References Cited

U.S. PATENT DOCUMENTS

2002/0138182 A1   9/2002  Swales et al.
2003/0080614 A1   5/2003  Soga
(Continued)

FOREIGN PATENT DOCUMENTS

| EP | 1 306 263 | 5/2003 |
|---|---|---|
| EP | 2 055 588 | 5/2009 |
| WO | 2005 110827 | 11/2005 |

OTHER PUBLICATIONS

French Search Report Issued May 11, 2012 in French Application No. 1159106 Filed Oct. 10, 2011.
(Continued)

*Primary Examiner* — Yuri Kan
(74) *Attorney, Agent, or Firm* — Oblon, McClelland, Maier & Neustadt, L.L.P.

(57) ABSTRACT

A braking matching method for a vehicle equipped with a regenerative braking means and with an additional braking means that have different response times, involving generating a braking setpoint that is matched (see opposite CF) to said braking means, by the temporal filtering of a braking setpoint ($C_e$) intended for one of said braking means.

12 Claims, 3 Drawing Sheets

(51) Int. Cl.
*B60K 6/52* (2007.10)
*B60T 13/58* (2006.01)
*B60W 10/08* (2006.01)
*B60W 10/184* (2012.01)
*B60W 30/18* (2012.01)
*B60L 7/26* (2006.01)

(52) U.S. Cl.
CPC ..... *B60L 2240/12* (2013.01); *B60T 2270/604* (2013.01); *B60W 2720/106* (2013.01); *B60Y 2300/89* (2013.01)

(56) References Cited

U.S. PATENT DOCUMENTS

| | | | |
|---|---|---|---|
| 2004/0054450 A1 | 3/2004 | Nakamura et al. | |
| 2005/0200197 A1* | 9/2005 | Crombez | B60L 7/18 303/152 |
| 2005/0269875 A1* | 12/2005 | Maki | B60L 7/26 303/152 |
| 2009/0118887 A1 | 5/2009 | Minarcin et al. | |
| 2010/0030444 A1* | 2/2010 | Roll | B60T 8/1766 701/80 |
| 2010/0070147 A1* | 3/2010 | Semsey | B60T 8/1766 701/70 |
| 2010/0211280 A1* | 8/2010 | Cayol | B60K 6/52 701/70 |
| 2010/0235043 A1* | 9/2010 | Seta | B60L 3/0038 701/29.2 |
| 2011/0303498 A1 | 12/2011 | Crombez et al. | |
| 2012/0061193 A1* | 3/2012 | Mayer | B60T 8/441 188/106 P |
| 2012/0265382 A1* | 10/2012 | Nefcy | B60W 10/06 701/22 |

OTHER PUBLICATIONS

International Search Report Issued Jun. 11, 2013 in PCT/FR12/052292 Filed Oct. 9, 2012.

* cited by examiner

REGENERATIVE BRAKING SETPOINT MATCHING

BACKGROUND

The present invention relates to the control of braking for a vehicle equipped with a regenerative braking means, for example an electric braking means, and with an additional friction-type braking means, for example a hydraulic braking means, notably on an electrically powered vehicle.

On a vehicle equipped with at least one electric traction or propulsion motor it is possible, under certain conditions, to use the electric motor as a generator and thus obtain an electric braking means. Such use is advantageous because, being regenerative, it allows some of the energy to be recovered in order to recharge the batteries.

An apportioning system has been designed to apportion an overall braking command between an electric braking command intended for an electric braking means and an additional braking command intended for an additional braking means. This apportioning system is designed to bring about certain transitions to all-electric braking or purely friction braking.

For example, in the event of the detection of a malfunctioning of the electric actuator, the electric braking is deactivated.

In another example, when the vehicle is running at relatively low speeds, the braking is entirely hydraulic. Provision is therefore made for electric braking to be progressively deactivated according to the speed of the vehicle.

FIG. 1 illustrates this transition in a situation in which the driver is applying a constant braking command so that the speed decreases over time. The instant t1 corresponds to a speed of 14 km/h, the instant t2 corresponds to a vehicle speed of 7 km/h. The solid curve corresponds to the electric braking setpoint and the dashed curve corresponds to the hydraulic braking setpoint. These two setpoints are determined by an apportioning system as described hereinabove, notably as a function of an overall braking setpoint corresponding to the pressure of the driver on the pedal.

As may be noted from FIG. 1, these two thresholds at 14 and 7 km/h correspond to a transition to hydraulic braking as the vehicle gradually decelerates.

Now, the various means of braking a same vehicle may have different response times. For example, an electric braking means may have a response time of the order of 100 milliseconds, whereas the response time for a hydraulic braking means and the means may be rather of the order of 200 milliseconds.

It therefore sometimes happens that the switchover from all-electric braking to all-hydraulic braking is accompanied by a short variation in the braking torque actually applied. The user may thus have a sensation of brake release, associated with such a hole in the deceleration.

Referring back to FIG. 1, the curve in dot-dash line corresponds to the actual deceleration of the vehicle. As can be seen, for speeds slightly below 14 km/h, there is a brief drop in the actual braking, even though the user is still applying constant pressure to the brake pedal.

This hole in the deceleration may be disturbing to the user who may find himself braking harder to compensate. This phenomenon is especially disturbing to the user since it will not occur at other speeds, for example at 50 km/h.

There is therefore a need for a method and a system that would improve user perception.

It has been envisioned to spread the transition described hereinabove over a broader range of speeds, for example between 20 and 7 km/h rather than between 14 and 7 km/h, so that the switchover occurs more slowly. Nevertheless, this leads to a limitation on the regenerative braking and therefore on the possibility of recharging the batteries.

BRIEF SUMMARY

There is proposed a method for matching braking for a vehicle equipped with a regenerative braking means, for example an electric braking means, and with an additional braking means, for example a hydraulic braking means. This method comprises generating a matched braking setpoint matched to these braking means, by the temporal filtering of a braking setpoint intended for one of these braking means, particularly the regenerative braking setpoint intended for the regenerative braking means.

The temporal filtering may for example consist in applying to the braking setpoint a first order linear filter in $e^{-t/\tau}$, a Bessel filter or the like, or alternatively still, applying a systematic delay to the temporal samples of the braking setpoint. Linear filtering or nonlinear filtering may be provided.

The time constant or delay introduced may advantageously be carefully chosen to cause the periods of overbraking or of underbraking during the transitions in the apportioning of an overall braking command between the regenerative braking means and the additional braking means to disappear. The delay may for example be chosen to be equal to a difference between an estimate of the response time of the additional braking means and an estimate of the response time of the regenerative braking means.

Advantageously, the matched braking setpoint may be a function of the direction of variation of the braking setpoint intended for the regenerative braking means or of the braking setpoint intended for the additional braking means.

Advantageously, a step of determining a direction of variation of this braking setpoint may be provided.

Advantageously, the matched filtering setpoint may be unfiltered when an increase in absolute value is detected in the braking setpoint intended for the regenerative braking means. This then avoids delaying the application of the electric braking and therefore avoids limiting the recovery of energy. Furthermore, any temporary demands on the hydraulic braking means are thus avoided, as then too is the premature aging of the hydraulic actuator.

Thus it is advantageously possible to envision detection of the direction of variation of the command setpoint for the electric braking means, for example, by comparing the command setpoint for the electric braking means as calculated by an apportioning device with the filtered command setpoint for the electric braking means, i.e., for example, the value output by the temporal filter. This filtered value corresponds to the setpoint of the electric braking means from a previous instant. If the filtered setpoint is lower in terms of absolute value than the unfiltered setpoint, then it may be assumed that the setpoint of the electric braking means is increasing (in terms of absolute value) and therefore an unfiltered matched braking setpoint value can be generated. For example, filtering may be deactivated, bypassed, carried out with a zero time constant, etc.

By contrast, if it is detected that the electric braking setpoint is decreasing in terms of absolute value, then the matched braking setpoint value may be a temporaly filtered value.

Provision may be made for the filtered electric braking setpoint values to be compared with the respective electric braking setpoint values prior to filtering. Because these values are negative, a setpoint value corresponding to heavy braking will have a high absolute value.

At each instant in the sampling, a difference value can be calculated that is equal to the electric braking setpoint value emanating from an apportioning device, from which is subtracted the filtered electric braking setpoint value. If this difference is above a threshold then the filtering is applied with a given time constant $\tau$. If not, if this value is below the threshold, then the time constant $\tau$ is chosen to be equal to 0.

Advantageously, this threshold is chosen to be negative with a value close to 0. This is because while the electric braking setpoint varies relatively little, there may still be a small amount of noise. Providing a slightly negative threshold means that filtered values can be generated in a stable manner, avoiding potential fluctuations between filtering and not filtering which are associated with this noise.

The invention is not in any way limited by the choice of unfiltered values when the electric braking setpoint increases in terms of absolute value. It is for example possible to choose, for the matched braking setpoint values, that are filtered independently of the variations of the electric braking setpoint at the output from the apportioning device. In the event of the electric braking means command setpoint increasing in terms of absolute value, the filtering may make it possible to avoid a spike of overbraking.

The apportioning device may be arranged in such a way as to limit the value of the electric braking setpoint or even as to completely deactivate regenerative braking as a function of the values of safety signals. For example, the apportioning system may receive signals emanating from a supervisor able to detect failure of a sensor of the electric actuator and/or other. As a function of the value of this signal, the electric braking may be completely deactivated. According to another example, the apportioning system may comprise a stability indicator module able to generate a stability indicator value. This value corresponds to the electric braking considered to be acceptable by the vehicle. According to the values of the stability indicator and of the signal emanating from the supervisor, the electric braking setpoint value may be limited in terms of absolute value or even reduced to 0.

Advantageously and nonlimitingly, the matched braking setpoint is also a function of at least one safety signal, for example of at least one signal emanating from at least one stability sensor and/or a stability indicator signal. Specifically, it may prove advantageous not to delay certain deactivations or limitations because these deactivations or limitations may be connected with the safety of the driver and the passengers. This method may thus take such priority cutoffs into consideration.

Advantageously and nonlimitingly provision may be made for the filtered signal to be limited by the signal or signals able to completely or partially limit the electric braking setpoint in the apportioning system, i.e. for example the stability indicator signal and/or the signal emanating from the supervisor.

The filtering module may be compatible with the apportioning systems already developed.

Advantageously, limitations connected with safety may also be carried out upstream of the filtering module, in the apportioning system, so as to avoid these limitations being eliminated when the filtering is bypassed for example.

Also proposed is a computer program comprising instructions for executing the method described hereinabove. This program can be implemented in a processor carried onboard a motor vehicle, for example in a microcontroller, a DSP (from the English "Digital Signal Processor") or the like.

Also proposed is a braking matching device for a vehicle equipped with a regenerative braking means and with an additional braking means. This device is designed to generate a matched braking setpoint matched to these braking means, by the temporal filtering of a braking setpoint intended for one of these braking means, in particular the regenerative braking setpoint intended for the regenerative braking means.

Also proposed is an apportioning system comprising an apportioning device and a matching device as described hereinabove.

Also proposed is a motor vehicle, for example an electric or hybrid motor car, comprising the apportioning system and/or the matching device which is or are described hereinabove.

BRIEF DESCRIPTION OF THE DRAWINGS

The invention will be better understood with reference to the figures which are given by way of example.

DETAILED DESCRIPTION

Figure 2A:
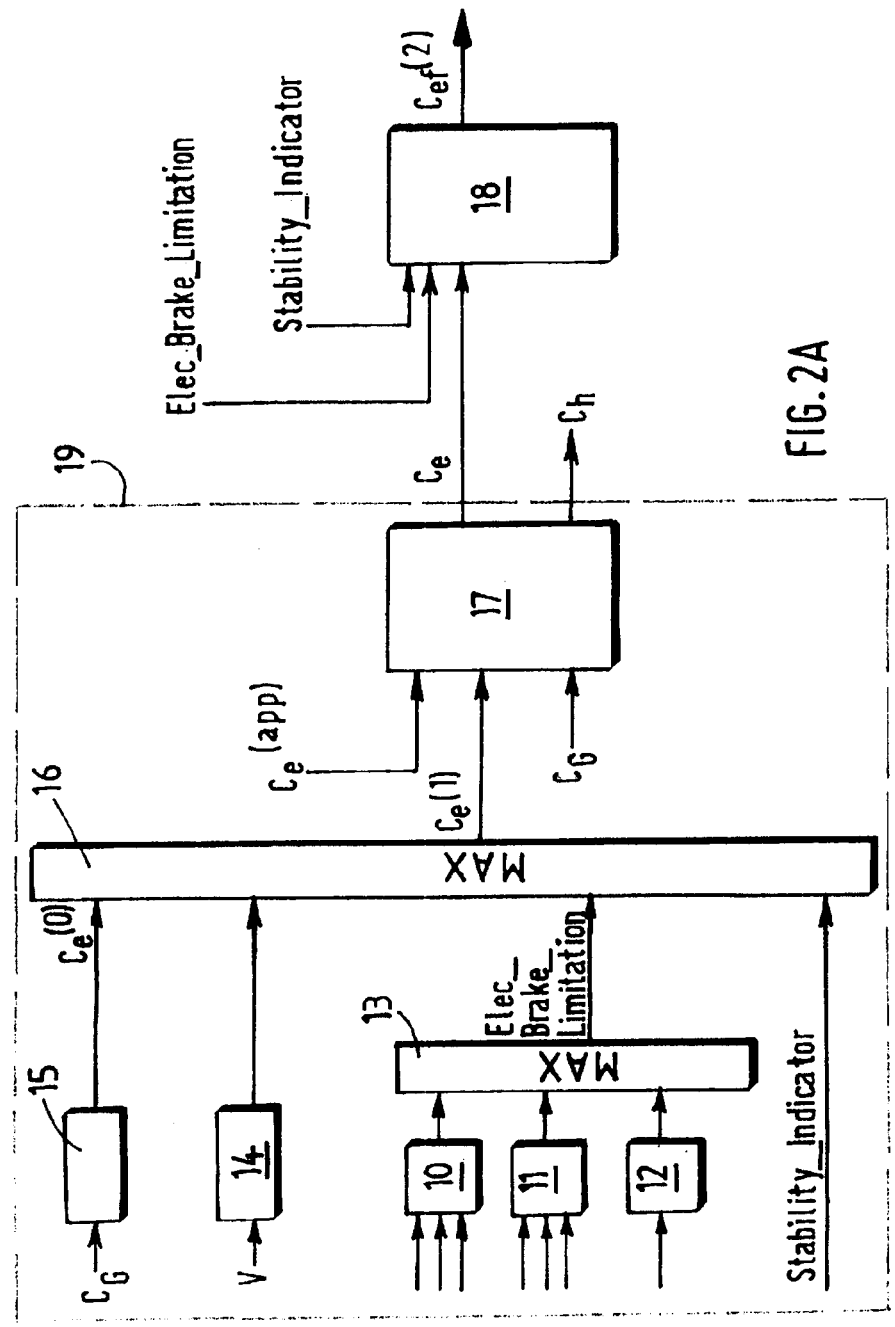
FIG. 2A is a diagram of an apportioning system comprising an apportioning device and a matching device according to one embodiment of the invention.

With reference to FIG. 2A, an apportioning device 19 is installed in an electric vehicle (not depicted) with an uncoupled brake pedal. This vehicle thus comprises a regenerative braking means (not depicted), namely an electric actuator, and an additional braking means, in this instance a hydraulic actuator.

This device 19 may for example comprise or be incorporated in one or more processors.

This device 19 receives at input an overall braking setpoint signal $C_G$ corresponding to pressure on the pedal and performed by the driver. A calculation module 15 makes it possible to determine a first electric braking value $C_e^{(0)}$ by saturation of the signal $C_G$ received.

The system 19 also receives at input a vehicle speed value V. A module 14 makes it possible to determine, where appropriate, a signal to deactivate the regenerative braking as a function of the vehicle speed. Notably, when the vehicle speed is below 7 km/h, the signal emanating from the module 14 allows the electric braking to be completely deactivated.

The apportioning system also receives a stability indicator value that comes from a stability indicator module, not depicted. This is because electric braking involves just two wheels whereas hydraulic braking is performed on all four wheels of the vehicle. There is therefore a risk of in the event of excessively abrupt electric braking.

Unpublished patent application FR 1058539 describes a braking system architecture in which the status of the wheels is monitored using sensors. The measurements taken by this or these sensors make it possible to formulate a stability indicator Stability_Indicator which is taken into consideration when apportioning the pedal braking command between the electric braking command and the additional braking command. This stability indicator module is designed to determine a stability indicator which is updated in real time as a function of values received from sensors able to evaluate the speed, longitudinal acceleration, lateral acceleration, and rate of slipping of the wheels of the vehicle. The stability indicator may also be a function of information on an antilock braking system (referred to as an ABS control system from the German Antiblockiersystem) or a traction control system. When the vehicle approaches a state of instability, for example during ABS control on engine brake, such a signal makes it possible to limit the regenerative braking so as to bring the wheels back into their stability domain.

The value of the stability indicator Stability_Indicator corresponds to the electric braking considered to be acceptable. These values are comprised between 0, which corresponds to the case where the braking has to be fully hydraulic, and a maximum value.

The apportioning system also receives several signals emanating from sensors (not depicted), supervisors (not depicted), etc.

A module 10 receives signals emanating from sensors able to measure certain parameters of the electric actuator. This module 10 thus makes it possible to generate a signal for deactivating electric braking if malfunctioning of the regenerative braking means is detected.

The motor signals deactivation module 11 receives signals originating from sensors able to measure values of parameters that characterize the state of the motor. Once again, this module 11 makes it possible to obtain a deactivation signal, if appropriate, in the event of a malfunction being detected.

In the same way, the module 12 receives signals coming from sensors and is able to generate a deactivation signal.

A module 13 generates a signal Elec_Brake_Limitation, by taking a maximum of the signals emanating from the modules 10, 11, 12.

The braking setpoint value and the values of these safety signals, Elec_Brake_Limitation, Stability_Indicator are negative. By choosing the signal that has a maximum value, it is in fact the signal that has the lowest absolute value that is being chosen.

The module 16 also generates a signal $C_e^{(1)}$ by likewise taking a maximum from the signals emanating from the respective modules 14, 15, the malfunction signal Elec_Brake_Limitation and the signal Stability Indicator.

The signal $C_e^{(1)}$ emanating from the module 16 corresponds to a first electric braking setpoint value.

The module 17 receives this first value $C_e^{(1)}$ as well as the value $C_G$ corresponding to the pressure of the driver on the pedal and a signal $C_e^{(app)}$ of the electric braking torque actually being applied in response to the setpoint $C_e^{(1)}$.

The module 17 compares these various values and determines an electric braking setpoint $C_e$ and a hydraulic braking setpoint $C_h$. The hydraulic braking setpoint $C_h$ may be chosen to be equal to the difference between the overall braking setpoint $C_G$ and the torque actually applied $C_e^{(app)}$.

Unpublished application FR 1153410 describes more detailed examples of apportioning devices.

Now, the hydraulic actuator (not depicted) which receives this hydraulic braking setpoint $C_h$ at input has a response time of the order of 200 milliseconds, whereas the electric actuator has a shorter response time, of the order of 100 milliseconds.

A matching device 18 allows the electric braking setpoint signal $C_e$ to be filtered so that the electric and hydraulic actuators achieve the corresponding setpoints at relatively similar response times. This matching device 18 makes it possible to obtain a matched electric braking setpoint signal $C_{e.f.}^{(2)}$.

Figure 2B:
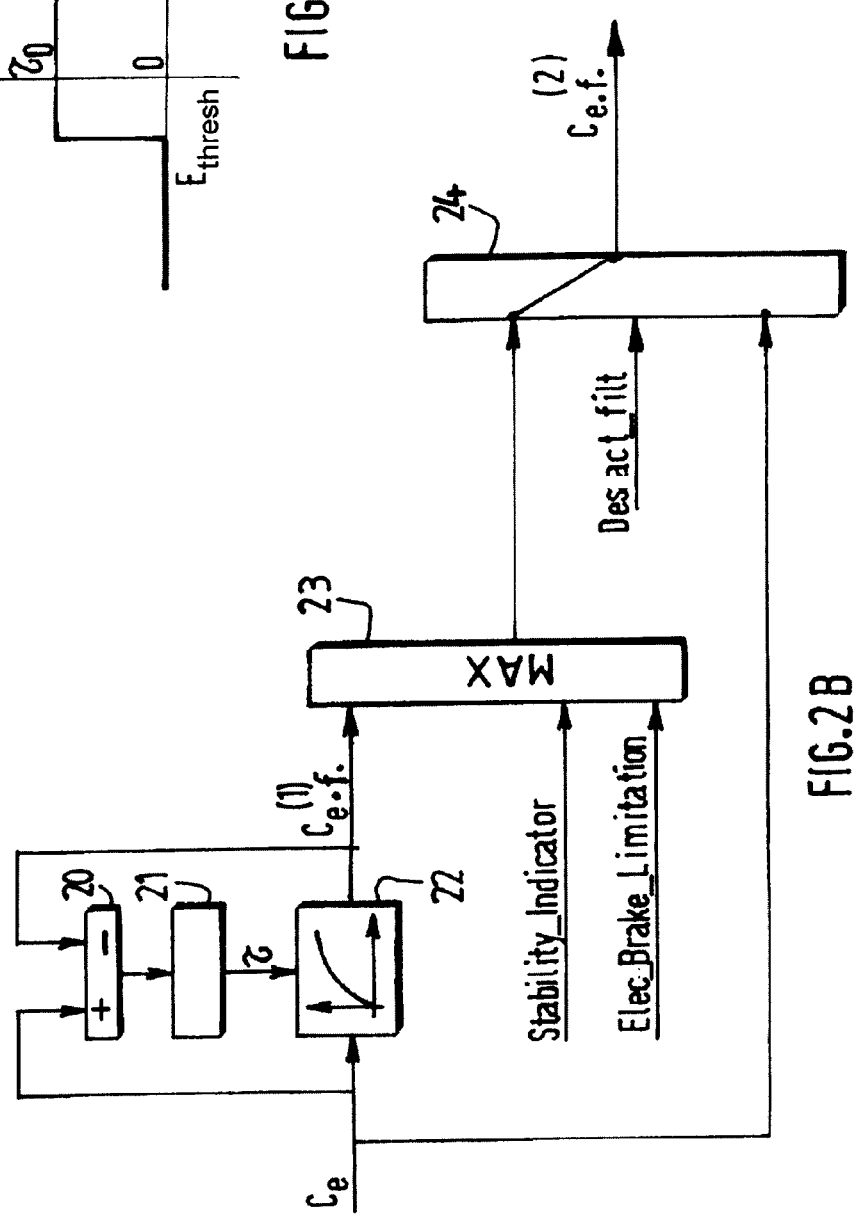
FIG. 2B is a diagram illustrating in greater detail one example of a matching device according to one embodiment of the invention.

FIG. 2B shows this matching device 18 in more detail.

With reference to this FIG. 2B, the electric braking setpoint signal $C_e$ emanating from the apportioning device is received by a filtering module 22 capable of applying a first-order linear filtering $e^{-t/\tau}$ to this signal with a time constant $\tau$.

Figure 3:
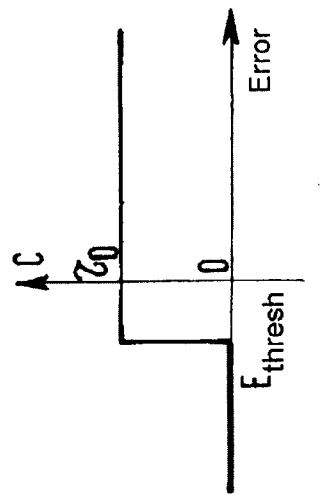
FIG. 3 is a graph showing how the delay $\tau$ introduced is calculated as a function of the difference between the braking setpoint emanating from the apportioning system and the filtered electric braking setpoint in one embodiment of the invention.

The value $\tau$ is chosen to be equal to a value $\tau 0$, for example equal to 100 milliseconds, or even zero depending on the value of a difference between a filtered value $C_{e.f.}^{(1)}$ and a value emanating from the apportioning device $C_e$ at a given sampling instant. This difference Error is interpreted as reflecting the direction of variation of the electric braking setpoint. If this difference Error, determined by a module 20, is higher than a value $E_{thresh}$ the delay $\tau$ is chosen to be equal to the value $\tau 0$ (see FIG. 3). If not, the time $\tau$ is chosen to be equal to zero, i.e. the module 22 then does not introduce any delay.

It is possible for example to choose the value To equal to the difference between the response times of the electric and hydraulic actuators, these response times being taken from a calibration or a map, or alternatively still, measured.

The filtering module also receives the signal Stability_Indicator, as well as the signal Elec_Brake_Limitation. A module 23 makes it possible to choose the maximum (i.e. the minimum in terms of absolute value) between the filtered value $C_{e.f.}^{(1)}$, the signal Stability_Indicator and the signal Elec_Brake_Limitation. Stated differently, no delay is introduced in the event of priority cutoff associated with a malfunctioning or with a risk of instability.

In this embodiment, the matching device also comprises a module 24 controlled by a filtering deactivation signal Deact_filt. This signal may for example have a boolean value. Depending on the value of this signal, the matched setpoint value $C_{e.f.}^{(2)}$ is chosen to be equal to the regenerative braking setpoint value $C_e$ at the input to the matching device or to the value at the output from the module 23.

In the embodiment depicted, the filtering module 22 continues to operate normally whatever the value of the signal Deact_filt. Stated differently, the braking module 22 and the module 23 can be bypassed.

Figure 1:
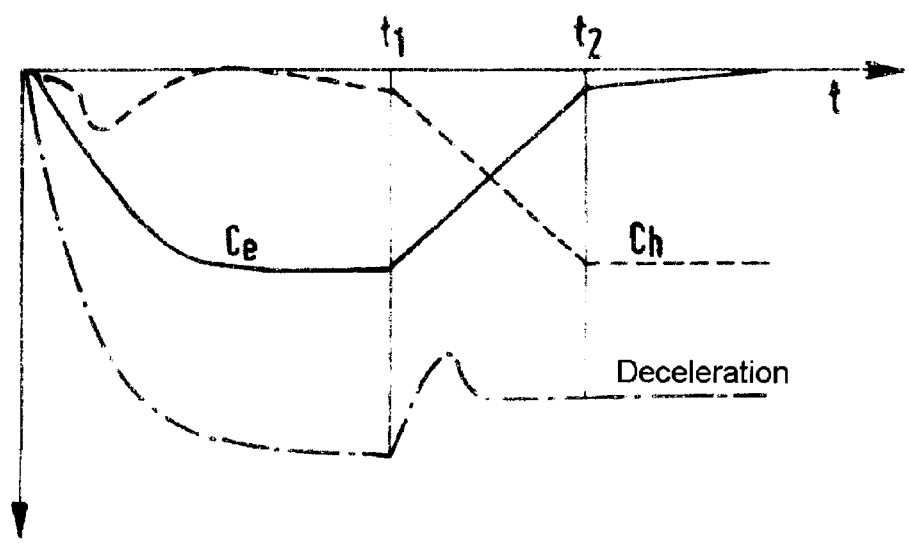
FIG. 1, already discussed, is a graph showing the change in electric braking setpoint, in hydraulic braking setpoint and in actual deceleration over a period of constant driver braking.

Returning to FIG. 1, it will be noted that it is advantageous to keep the signals Stability_Indicator, Elec_Brake_Limitation at the input to the module 16 because it is possible for these safety signals Stability_Indicator and Elec_Brake_Limitation not to be taken into consideration by this design of matching device 18 depending on the value of the signal Deact_filt.

The present invention is not restricted to the overview that has just been given and alternative forms of embodiment may be envisioned. Indeed, it may be envisioned for filtering to be direct or otherwise. For example, as an alternative, provision may be made for the additional braking setpoint to be determined using an apportioning module, for this additional braking setpoint to be filtered, for the regenerative braking setpoint to be determined from the filtered setpoint and from an overall braking setpoint by calculating a complement for example, and finally:

the unfiltered additional braking setpoint to be applied to the additional braking means, and the regenerative braking setpoint (which in fact is indirectly filtered) to be applied to the regenerative braking means.

The invention claimed is:

1. A method for matching braking for a vehicle equipped with at least one processor, a regenerative braking means and an additional braking means, comprising:

determining, via the processor, an overall braking setpoint to apply to the vehicle;

apportioning, via the processor, the overall braking setpoint between the regenerative braking means and the additional braking means by calculating a regenerative braking setpoint for the regenerative braking means and an additional braking setpoint for the additional braking means; and generating, via the processor, a matched braking setpoint $(C_{e.f.}^{(2)})$ matched to said regenerative braking means or said additional braking means, by temporal filtering of the regenerative braking setpoint or the additional braking setpoint, the temporal filtering including adding a time delay to the regenerative braking setpoint or the additional braking setpoint such that the regenerative braking means achieves that regenerative braking setpoint and the additional braking means achieves the additional braking setpoint at a same time.

2. The method as claimed in claim 1, in which the temporal filtering is applied to the reqenerative brakinq setpoint intended for the reqenerative brakinq means.

3. The method as claimed claim 1, in which the matched braking setpoint $(C_{e.f.}^{(2)})$ is a function of a direction of variation of the regenerative braking setpoint intended for the regenerative braking means and/or of the additional braking setpoint intended for the additional braking means.

4. The method as claimed in claim 3, comprising a step of determining the direction of variation of the regenerative braking setpoint intended for the regenerative braking means by comparing a setpoint value intended to undergo the temporal filtering at a given instant with a setpoint value $(C_{e.f.}^{(2)})$ that is filtered at said given instant.

5. The method as claimed in claim 4, in which, if an increase in absolute value is detected in regenerative filtering setpoint values then the matched braking setpoint $(C_{e.f.}^{(2)})$ is unfiltered.

6. The method as claimed in claim 3, in which the matched braking setpoint $(C_{e.f.}^{(2)})$ is also a function of at least one signal (Elec_Brake_Limitation) emanating from at least one sensor, wherein a value of the at least one sensor indicates a possible malfunction and/or of at least one stability indicator signal (Stability_Indicator).

7. A computer program stored on at least one processor comprising instructions for executing the method as claimed in claim 1.

8. A braking matching device for a vehicle equipped with a regenerative braking means, and with an additional braking means, said device comprising:

at least one processor configured:

to generate a matched braking setpoint $(C_{e.f.}^{(2)})$ matched to said regenerative braking means or said additional braking means, by temporal filtering of a regenerative braking setpoint intended for said regenerative braking means or an additional braking setpoint intended for the additional braking means, the temporal filtering including adding a time delay to the regenerative braking setpoint or the additional braking setpoint such that the regenerative braking means achieves that regenerative braking setpoint and the additional braking means achieves the additional braking setpoint at a same time.

9. A brake apportioning system for the vehicle equipped with the regenerative braking means and with the additional braking means, comprising an apportioning device for apportioning a braking command between the regenerative braking setpoint intended for said regenerative braking means and the additional braking setpoint intended for said additional braking means, and the matching device for matching the regenerative braking setpoint as claimed in claim 8.

10. The motor vehicle comprising:

the regenerative braking means;

the additional braking means; and the brake apportioning system as claimed in claim 9.

11. The device as claimed claim 8, in which the matched braking setpoint $(C_{e.f.}^{(2)})$ is a function of a direction of variation of the regenerative braking setpoint intended for the regenerative braking means, and the at least one processor is configured to determine the direction of variation of the braking setpoint intended for the regenerative braking means by comparing a setpoint value intended to undergo the temporal filtering at a given instant with a setpoint value $(C_{e.f.}^{(2)})$ that is filtered at said given instant.

12. A method for matching braking for a vehicle equipped with at least one processor, a regenerative braking means and an additional braking means, comprising:

generating, via the processor, a matched braking setpoint $(C_{e.f.}^{(2)})$ matched to said regenerative braking means or said additional braking means, by temporal filtering of a setpoint intended for one of said braking means, the matched braking setpoint $(C_{e.f.}^{(2)})$ being a function of a direction of variation of a regenerative braking setpoint intended for the regenerative braking means and/or of an additional braking setpoint intended for the additional braking means; and determining, via the processor, the direction of variation of the regenerative braking setpoint intended for the regenerative braking means by comparing a setpoint value intended to undergo the temporal filtering at a given instant with a setpoint value $(C_{e.f.}^{(2)})$ that is filtered at said given instant.

* * * * *